(12) United States Patent
Gregory

(10) Patent No.: US 6,305,848 B1
(45) Date of Patent: Oct. 23, 2001

(54) HIGH DENSITY OPTOELECTRONIC TRANSCEIVER MODULE

(75) Inventor: Bryan R. Gregory, Glen Ellyn, IL (US)

(73) Assignee: Corona Optical Systems, Inc., Lombard, IL (US)

( * ) Notice: Subject to any disclaimer, the term of this patent is extended or adjusted under 35 U.S.C. 154(b) by 0 days.

(21) Appl. No.: 09/595,671

(22) Filed: Jun. 19, 2000

(51) Int. Cl.[7] ........................................................ G02B 6/36
(52) U.S. Cl. ............................... 385/53; 385/88; 385/134
(58) Field of Search ................................... 385/53, 88–94, 385/134, 135

(56) References Cited

U.S. PATENT DOCUMENTS

| | | | |
|---|---|---|---|
| 4,944,568 | * | 7/1990 | Danbach et al. ........................ 385/88 |
| 5,151,961 | * | 9/1992 | Hvezda et al. ...................... 385/92 X |
| 5,231,685 | * | 7/1993 | Hanzawa et al. ................... 385/92 X |
| 5,611,013 | * | 3/1997 | Curzio ...................................... 385/89 |
| 6,056,448 | * | 5/2000 | Sauter et al. ............................ 385/92 |

FOREIGN PATENT DOCUMENTS

0335531 A2 * 10/1989 (EP) ........................................ 385/60

* cited by examiner

Primary Examiner—John D. Lee
(74) Attorney, Agent, or Firm—Welsh & Katz, Ltd.

(57) ABSTRACT

A high-density blindmate optoelectronic module is provided. The high-density module is adapted to mount on a removable printed circuit board which is configured to be inserted into a printed circuit board support rack located within a chassis based network element. The high-density module is configured to blindmate with a multi-fiber optical connector mounted within the chassis based network element. The high-density blindmate optoelectronic module is formed of a transceiver mounting block which supports a plurality of connectorized optical sub-assemblies. Each connectorized optical sub-assembly includes a plurality of optical transmitters, optical receivers, or a combination of optical transmitters and optical receivers. The optical transmitters and/or receivers define optical axes that extend through a first side of connectorized optical sub-assemblies. The high-density blindmate optoelectronic module includes circuitry for driving the optical transmitters and processing optical signals received by the optical receivers. An electrical interface is provided for transferring signals between the transceiver module and the removable printed circuit board.

19 Claims, 5 Drawing Sheets

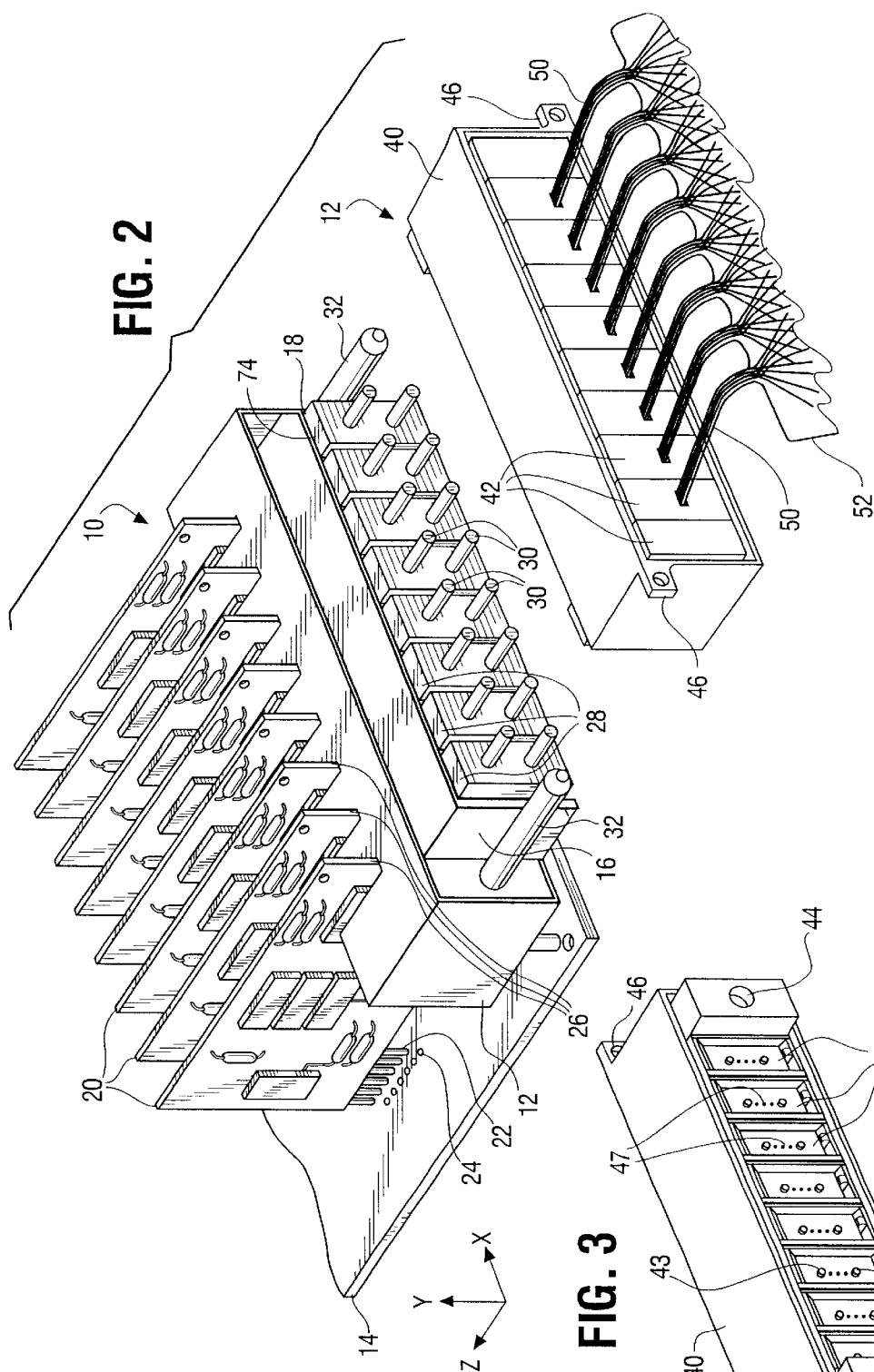
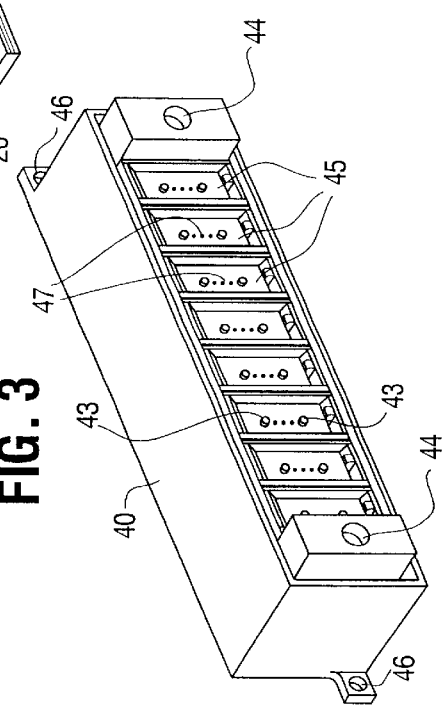
FIG. 2
FIG. 3

HIGH DENSITY OPTOELECTRONIC TRANSCEIVER MODULE

BACKGROUND OF THE INVENTION

The present invention relates to a high-density blindmate optoelectronic module and mating optical connector. The high-density blindmate optoelectronic module is particularly well suited for use in high capacity optical network assemblies, such as optical routers, Dense Wavelength Division Multiplexed (DWDM) transmission equipment, and optical cross connects.

The above-named optical assemblies, and others like them, require numerous interconnections between various components within the assemblies. Typically, multiple optical transmitters and receivers are required for converting data signals between electrical and optical transmission media. A simplified perspective view of a typical prior art chassis based system is shown in FIG. 1. The chassis based system 100 includes a rack 102 comprising a plurality of tracks 104 extending perpendicularly from a backplane 106. The rack 102 is configured to receive a plurality of printed circuit boards 108. The printed circuit boards 108 may be inserted into tracks 104 and mated with connectors 110 mounted on the backplane 106. Most such assemblies include racks for receiving large numbers of removable printed circuit boards. The backplane 106 is configured to route signals between various optical and/or electrical circuits formed on the circuit boards 108 inserted into the rack.

The backplane 106 may include embedded optical fibers for carrying optical signals, conductive traces for carrying electrical signals, or some combination of both optical fibers and conductive traces for handling both optical and electrical signals. The optical and/or electrical circuits on the backplane couple signals between various points within the chassis based system, and may perform additional functions such as amplifying, splitting or multiplexing signals. Signals may be routed between printed circuit boards, or to different points on the same circuit board.

The interface between the printed circuit boards 108 and the backplane 106 is formed along the rear edge of the printed circuit boards as the boards are inserted into the rack. The interface is formed by the act of inserting the printed circuit board into the rack. This is known in the art as a blindmate connection because the connector components that form the interface align and mate of their own accord when the printed circuit board is installed in the rack and the interface occurs within the rack, away from the technician installing the printed circuit board. In such a connector, the signal interface must automatically couple each signal that is to be transmitted from the printed circuit board to the appropriate backplane circuit, be it an optical fiber or a conductive circuit trace. Similarly, each signal originating from the backplane and destined for a circuit formed on the circuit board must also be properly coupled with the correct circuit elements on the printed circuit board. All of this must be achieved by the simple act of inserting the printed circuit board into the rack.

The necessity of providing a blindmate connection between the removable circuit boards and the backplane poses significant difficulties for creating an optical interface capable of handling a large number of optical signals. The current generation of optoelectronic assemblies use fiber-optic connectors mounted on both the backplane and along the rear edge of the removable printed circuit boards. Fiber-optic connectors employed for this purpose may use single fiber connector ferrules or multi-fiber connector ferrules. Typically, optoelectronic modules will be mounted on the surface of a printed circuit board and optical fiber jumpers will be installed between the transceivers and the optical connectors mounted on the edge of the circuit board. The jumpers carry the optical signals emitted from the optical transmitters to the optical connector or from the connector to the optical receivers mounted elsewhere on the printed circuit board. A problem with this arrangement is that the optical transmitters and receivers (commonly referred to together as transceivers) take up a great deal of real estate on the printed circuit board, occupying space which could otherwise be dedicated to other purposes and provide additional functionality to the printed circuit board. Also, installing the optical fiber jumpers between the transceiver elements and the connector interface is time-consuming and expensive. The additional jumper attenuates the optical signal and adds to the cost.

Therefore, a need exists for a high-density blindmate optoelectronic module. Preferably, such a high-density blindmate optoelectronic module will include optical transmitters and receivers mounted directly within the module. The transceiver components will be arranged so that optical signals both transmitted and received by the module may be coupled directly to the backplane of a chassis based system, and the interface between the module and the backplane connector will form a blindmate optical connection whereby the high-density blindmate optoelectronic module is coupled to the backplane by sliding the printed circuit board on which the module is mounted into the chassis based system's support rack. It is desirable that such a high-density blindmate optoelectronic module occupy as little space as possible on the printed circuit board. It is also desirable that signals be directly coupled between the module's optical interface and the backplane without the need for optical fiber jumpers. Finally, it is also desirable that a high-density optoelectronic interface module have improved heat dissipation characteristics to protect the transceiver components within the module.

SUMMARY OF THE INVENTION

The present invention provides a high-density blindmate optoelectronic module. The module is adapted to be mounted along the rearward edge of a printed circuit board which is configured to be inserted into a rack support system within a chassis based system such as a network of routers, DWDM transmission equipment, optical cross connects, or other optoelectronic assemblies.

Throughout this specification the removable printed circuit boards that are configured to be inserted into the chassis based system's support rack and which interface with the backplane of the chassis based system will be referred to as a "mother boards". Each mother board may have additional components mounted on separate "daughter" cards that are interconnected with the circuits formed on the mother boards.

The high-density blindmate optoelectronic module is configured to quickly and accurately mate with the various circuits of a mother board. Further, the high-density blindmate optoelectronic module is adapted to blindmate with an optical connector mounted on the backplane of the chassis based system as the mother board is inserted into the support rack. Alignment structures within the high-density blindmate optoelectronic module act to align the optical signals emitted from the optical transmitting elements to optical fibers supported within the mating optical connector mounted on the backplane. Likewise, the optical signals carried by optical fibers within the backplane and terminating within the backplane mounted optical connector are aligned with optical receiver components within the high-density blindmate optoelectronic module.

In an embodiment of the invention, a high-density blindmate optoelectronic module comprises a transceiver mounting block. A plurality of daughter cards are mounted side by side within the transceiver mounting block. One or more optical transmitters, optical receivers, or combination of transmitters and receivers are mounted within the connectorized optical sub-assembly contained on each daughter card. Because density is critical, daughter cards are mounted perpendicular to the motherboard in a configuration that allows substantial increases in optical channel density. A pair of fine alignment pins protrude from a front surface of each connectorized optical sub-assembly and a pair of coarse alignment pins protrude from the transceiver mounting block. Optical transmitters mounted within the connectorized optical sub-assembly are positioned such that the light signals emitted by the transmitters are directed along optical axes that are precisely oriented relative to the output dimensions of the connectorized optical sub-assembly and extend through the front surface of the connectorized optical sub-assembly. Similarly, optical receivers mounted within the connectorized optical sub-assembly are positioned such that precision oriented optical signals received from the backplane side of the optical interface are directed to the appropriate photosensitive components of the receivers.

As noted, the high-density blindmate optoelectronic module is configured to blindmate with a similarly constructed fiber-optic connector. The fiber-optic connector supports a plurality of optical fibers which, when connected with the high-density blindmate optoelectronic module, are precisely aligned with the optical axes of the transmitter and receiver components mounted within the connectorized optical sub-assemblies. In order to accomplish this, the mating connector includes alignment bores for receiving the coarse alignment pins extending from the high-density transceiver module's transceiver mounting block. As the module is moved closer toward the fully connected position, the fine alignment pins protruding from the connectorized optical sub-assemblies engage fine alignment bores formed within multi-fiber connector ferrules within the mating connector.

Each connectorized optical sub-assembly is mounted to a corresponding daughter card. The daughter cards provide the electronic circuitry for driving the optical transmitters and processing the data signals received by the optical receivers mounted within the connectorized optical sub-assemblies. The transceiver blocks are attached to the daughter cards by way of electrical leads extending from the rear of the connectorized optical sub-assemblies. The electrical leads are soldered to circuit components formed on surfaces of the daughter cards. The circuitry contained on each of the daughter cards can be customized to fit the particular arrangement of transmitters and/or receivers mounted within each transceiver block. Each connectorized optical sub-assembly and daughter card assembly is inserted into the transceiver mounting block, with the front end of each connectorized optical sub-assembly protruding through the apertures formed in the transceiver mounting block. The daughter cards extend parallel to one another out the back end of the transceiver mounting block. The mounting block is thermally connected to each daughter card, which allows it to act as a heat sink. The mounting block also provides mechanical support to each daughter card and connectorized optical sub-assembly.

Because the daughter cards and connectorized optical sub-assemblies are mounted in a perpendicular fashion to the motherboard, signals coming from the motherboard and going to the top laser, and coming from the top photodiode to the motherboard, will have a longer path than the bottom laser and photodiodes. To eliminate channel to channel skew, the optical connection between a transmitter array and a receiver array is laid out so that the shortest signal path on the transmitter side is connected to the longest signal path on the receiver side. By shuffling subsequent fibers connecting lasers and photodiodes, each laser is matched with a complementary receiver to ensure constant channel to channel signal path length.

Each daughter card includes connector pins configured to mate with circuit elements formed on a mother board. For example, the connector pins may be press fit into conductive vias formed on the mother board, or the pins may be soldered to solder pads formed on the surface of the mother boards. In any case, the connector pins secure and electrically connect the daughter boards, and therefore the high-density blindmate optoelectronic module itself, to the mother board. The circuits connected to the connector pins include the operating voltages for the transceiver components, as well as the signals to be transmitted from the lasers and the signals received from the photodiodes.

BRIEF DESCRIPTION OF THE DRAWINGS

FIG. 2 is a perspective view of a high-density blindmate optoelectronic module according to the present invention, along with a mating fiber-optic connector seen from the rear;

FIG. 3 is a perspective view of the front of the mating fiber-optic connector of FIG. 2;

DETAILED DESCRIPTION OF THE INVENTION

Figure 1:
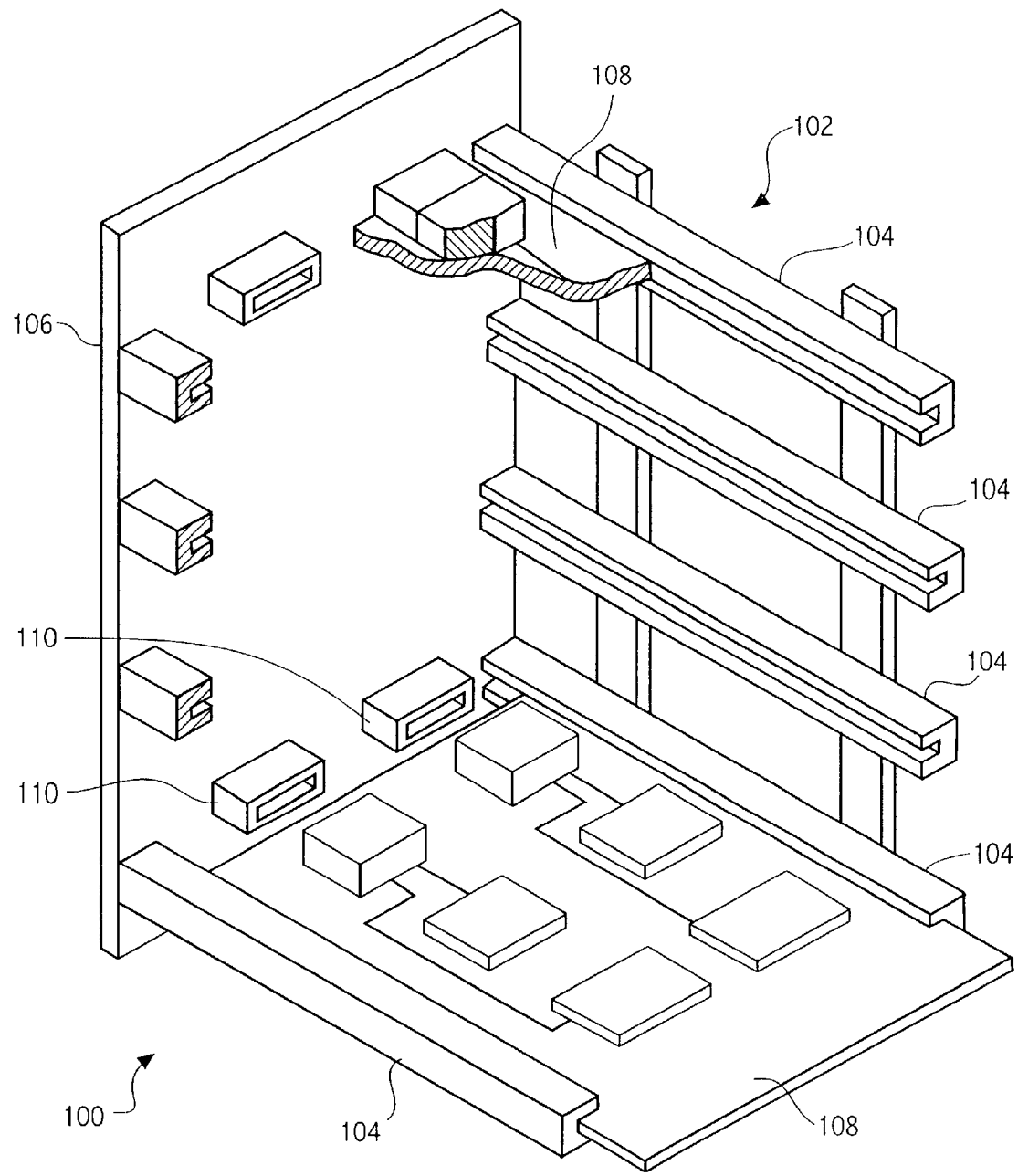
FIG. 1 is a simplified perspective view of a typical chassis based system.

Turning first to FIG. 2, a high-density blindmate optoelectronic module according to the present invention is a shown at 10. As can be seen, the high-density blindmate optoelectronic module is configured to mount on the rear edge of mother board 14. Mother board 14 is itself configured to mount within a printed circuit board support rack within an chassis based system similar to that described in the Background of the Invention section of this specification and shown in FIG. 1. Also depicted in FIG. 2 is a mating optical connector 12. The high-density blindmate optoelectronic module 10 is configured to interface with the mating optical connector 12. Typically, the mating optical connector 12 will be mounted on the backplane of a chassis based system in place of the connector 110 shown in FIG. 1. Alternatively, the mating optical connector 12 may be joined to an optical fabric such as the optical fabric 52 shown in the drawing. Regardless of the medium to which the mating optical connector 12 is to connect, be it a flexible optical fabric or a rigid backplane, the mating optical connector itself must be rigidly mounted within the chassis based system in order to receive the connecting portion of the high-density blindmate optoelectronic module 10 as the mother board 14 is inserted into the printed circuit board support rack of the chassis based system.

When the high-density blindmate optoelectronic module 10 is in fact connected with the mating optical connector 12, optical signals emitted from optical transmitters within the high-density blindmate optoelectronic module 10 are coupled to optical fibers mounted within the mating optical connector 12. Similarly, optical signals originating from elsewhere within the chassis based system and carried by optical fibers within the backplane or fabric 52 are coupled from the mating optical connector 12 to optical receivers mounted in the high-density blindmate optoelectronic module 10.

Figure 4:
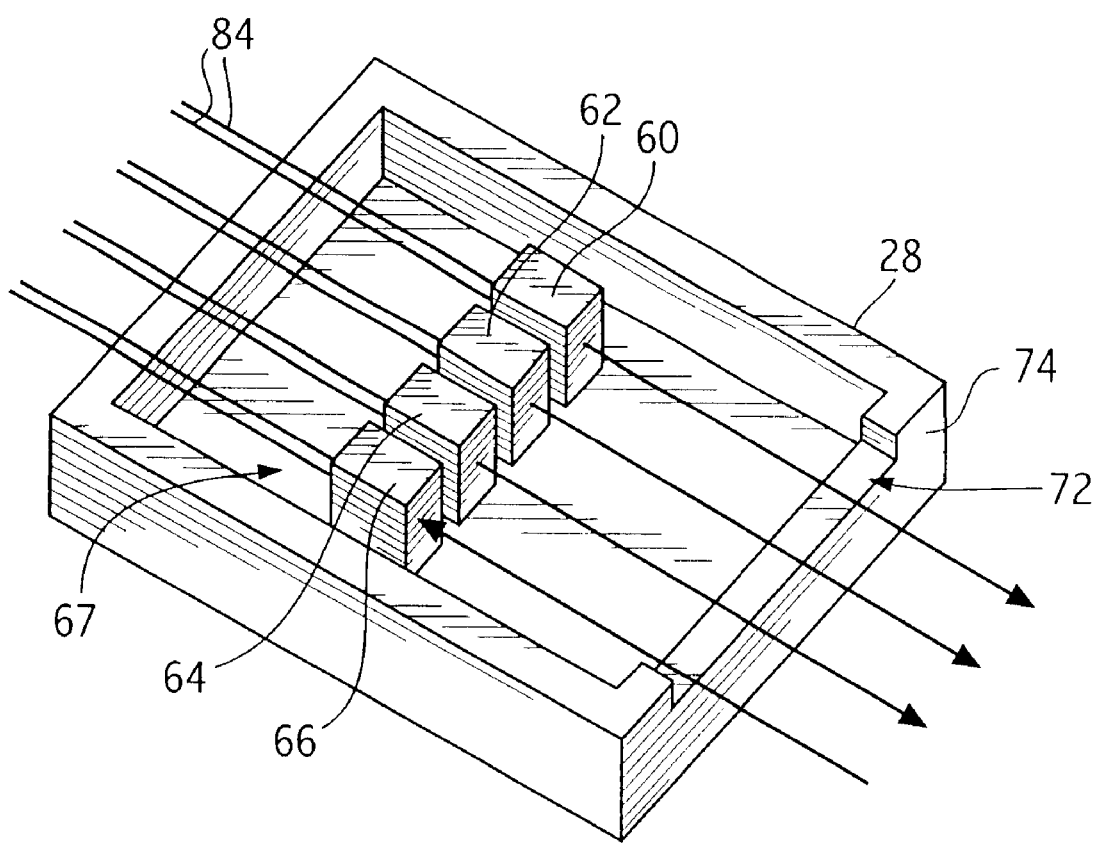
FIG. 4 is a perspective cross section view of an connectorized optical sub-assembly employed in a high-density blindmate optoelectronic module according to the present invention.

The high-density blindmate optoelectronic module 10 comprises a transceiver mounting block 16 which defines a plurality of apertures 18. Each of the apertures 18 is configured to receive a connectorized optical sub-assembly 28. A single connectorized optical sub-assembly 28 is shown in cross section in FIG. 4. A pair of optical transmitters 60, 62 and a pair of optical receivers 64, 66 are shown in block form mounted within a cavity 67, formed within the connectorized optical sub-assembly 28. Optical transmitters 60, 62 are positioned within the connectorized optical sub-assembly so as to emit an optical signal along a precisely defined optical axis that extends outward through the front surface 74 of the connectorized optical sub-assembly 28. Similarly, the optical receivers 64, 66 are positioned to receive optical signals directed along optical axes which are precisely located relative to the outer dimensions of the connectorized optical sub-assembly 28. Electrical leads 84 (see FIG. 4) connect to the transmitter and receiver components and extend through the back end of the connectorized optical sub-assembly 28.

Although the embodiment shown in FIG. 3 has two optical transmitters and two optical receivers, other combinations of optical transmitters and optical receivers may also be employed. For example, a connectorized optical sub-assembly 28 could be formed having optical transmitters only or optical receivers only. Or, a connectorized optical sub-assembly may have any combination of transmitters and receivers. Also, the total number of transceiver components mounted within the connectorized optical sub-assembly 28 is not limited to four. Any number of transmitters and/or receivers could be mounted within a connectorized optical sub-assembly, the total number of components being limited only by the size of sub-assembly. Most embodiments will have either 4, 8, or 12 transmitting and/or receiving components within each connectorized optical sub-assembly. This is due to the fact that most fiber-optic connectors, such as optical connector 12, are designed to have multi-fiber connector ferrules that support up to 12 optical fibers per ferrule. In the event that optical connectors are developed having a greater number of optical fibers mounted within the connector ferrules, it is contemplated that connectorized optical sub-assemblies 28 incorporated in the high-density blindmate optoelectronic module 10 of the present invention could be produced having a number of transceiver components equal to the number of fibers supported by any newly developed connector ferrules.

Figure 5:
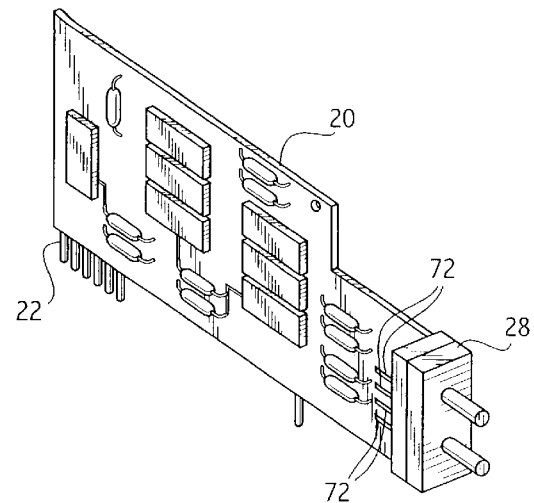
FIG. 5 is a perspective view of an connectorized optical sub-assembly connected to a daughter card.

Turning to FIG. 5, a single connectorized optical sub-assembly 28 is shown mounted to a daughter card 20. The electrical leads 84 extending from the back end of the connectorized optical sub-assembly 28 are soldered to solder pads 72 formed on a surface of the daughter card 20. The daughter card 20 contains circuitry and components for driving the optical transmitters and for processing signals received by the optical receivers housed within the connectorized optical sub-assembly 28. The signals for driving transmitters 60, 62 and the signals received by receivers 64, 66 are coupled between the daughter card 20 and the transceiver components within connectorized optical sub-assembly 28 through solder pads 72 and electrical leads 84 (see FIG. 4). Daughter card 20 further includes a plurality of contact pins 22.

Figure 6:
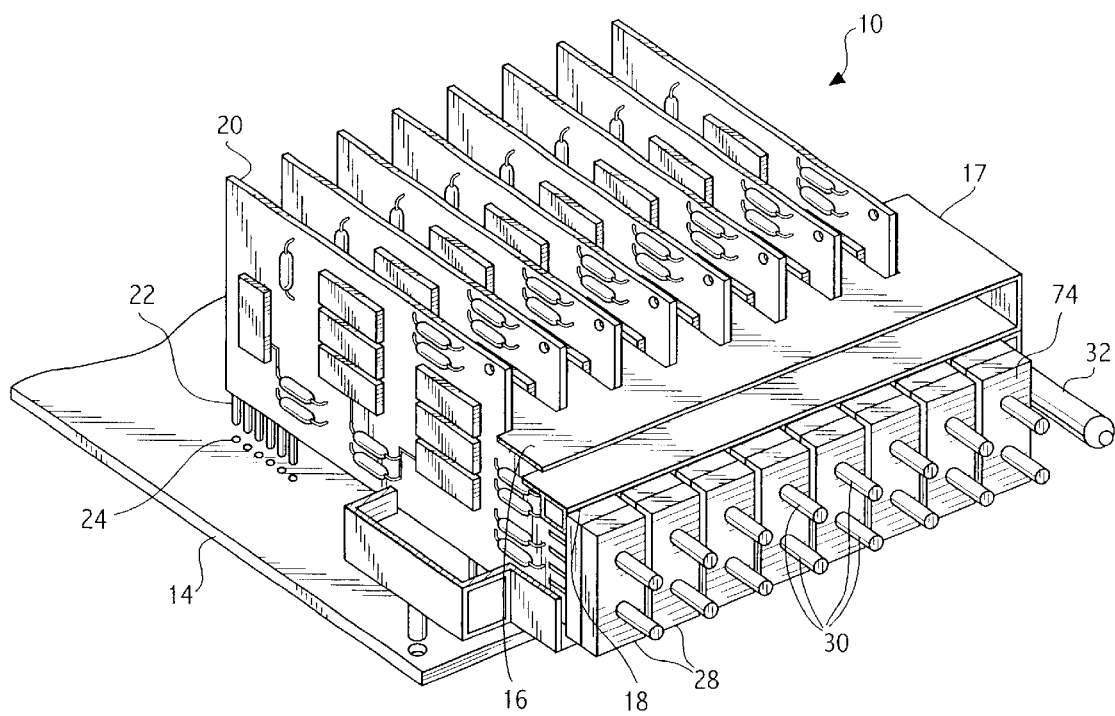
FIG. 6 is a cut-away perspective view of the high-density blindmate optoelectronic module shown in FIG. 1.

Returning to FIG. 2, and also referring to the partial cut-away view of FIG. 6, a plurality of connectorized optical sub-assemblies 28 are inserted into the apertures 18 formed in the transceiver mounting block 16. The daughter cards 20 protrude from the back end of the transceiver mounting block 16. The plurality of connectorized optical sub-assemblies 28 maintain a thermal connection with the transceiver mounting block 16. The transceiver mounting block has heat dissipation features which allow it to remove heat from the connectorized optical sub-assemblies 28 and circuit elements located on the daughter cards 20. This helps to cool the optical sub-assemblies and circuits, protecting them and increasing their useful life.

The transceiver mounting block 16 is surrounded by an outer connector shroud 17. Though not shown in the drawing, a mounting collar may be provided around the outer shroud 17. These features secure the assembly to the back-edge of the mother board. Since the high-density blindmate optoelectronic module 10 is mounted on the motherboard 14 and the mother board is inserted into a fixed track, a small degree of movement of the mating connector 12 in the X and Y directions is required to allow the connector 12 to properly align itself with the module 10. A spring or other biasing member may be included within the mating optical connector 12 to bias the interface in the forward Z direction to ensure a tight fit between the front surfaces 74 of the connectorized optical sub-assemblies and the front surfaces 45 of the connector ferrules formed within mating connector 12. In an alternative arrangement, the X, Y, and Z float may be provided in the high-density blindmate optoelectronic module 10, rather than on the mating optical connector 12.

The high-density blindmate optoelectronic module 10 is to be mounted along the rear edge of mother board 14. One method for connecting the module 10 to the mother board 14 is a press fit connection between the contact pins 22 protruding from daughter boards 20 and the mother board 14. Using this method, conductive contact vias 24 are formed within the mother board 14, corresponding to the locations of the contact pins 22. The dimensions of the contact pins 22 are closely matched to the vias 24. A small press can then be used to force the contact pins 22 into the contact vias 24. The compression fit between the contact pins 22 and vias 24 acts to secure the high-density blindmate optoelectronic module 10 to the mother board 14, and provides the electrical connection between the circuits on the mother board 14 and the daughter cards 20. Alternative mounting strategies include soldering the contact pins 22 within vias 24, using surface mount technologies for securing and connecting the daughter cards 20 to the mother board 14, or using a press fit card-edge connector such as the BPS interface from Molex, Inc. Mother board 14 is adapted to be inserted into the printed circuit board support rack of an chassis based system with the high-density blindmate optoelectronic module 10 mounted along the rear edge of the mother board facing the backplane of the chassis based system. When mounted in this way, the high-density blindmate optoelectronic module 10 is positioned to blindmate with the mating optical connector 12, which is mounted either directly on the backplane of the chassis based system or rigidly attached somewhere within the chassis based system. By inserting the mother board 14 into the chassis based system, the high-density blindmate optoelectronic module 10 engages the mating optical connector 12, thereby forming the interface between the module 10 and the backplane or optical fabric 52.

Turning to FIGS. 1 and 2, the blindmate connection between the high-density blindmate optoelectronic module 10 and the fiber-optic connector 12 occurs as the mother board 14 is inserted into the printed circuit board support rack as follows. As the mother board 14 is inserted into the printed circuit board support rack, the rear edge of the mother board 14 approaches the backplane. The high-density blindmate optoelectronic module 10 mounted along the rear edge of the mother board 14 is brought towards the mating optical connector 12. When the module 10 reaches the fiber-optic connector 12, the coarse alignment pins 32 protruding from the transceiver support block 16 engage coarse alignment bores 44 formed in the mating optical connector 12. As the coarse alignment pins 32 enter the coarse align bores 44, the position of the high-density blindmate optoelectronic module 10 is adjusted in the X and Y directions by the interaction of the coarse alignment pins 32 with the coarse alignment bores 44. The coarse alignment between the high-density blindmate optoelectronic module 10 and the mating optical connector 12 ensures that, as the mother board 14 is inserted further into the printed circuit board support rack, the fine alignment pins 30 protruding from the front surface 74 of each of the connectorized optical sub-assemblies 28, will engage the fine alignment bores 43 formed in the fiber support ferrules 42 within the mating optical connector 12. Once the mother board 14 is fully inserted into the printed circuit board support rack, the front surfaces 74 of the connectorized optical sub-assemblies 28 will abut and be biased against the front surfaces 45 of the connector ferrules 42 within optical connector 12. Once connected, optical fibers 47 supported within the connector ferrule 42 will be aligned with the optical axes of the optical transmitters and optical receivers mounted within the connectorized optical sub-assemblies 28 of the high-density blindmate optoelectronic module 10, and optical signal may be coupled therebetween.

Figure 7:
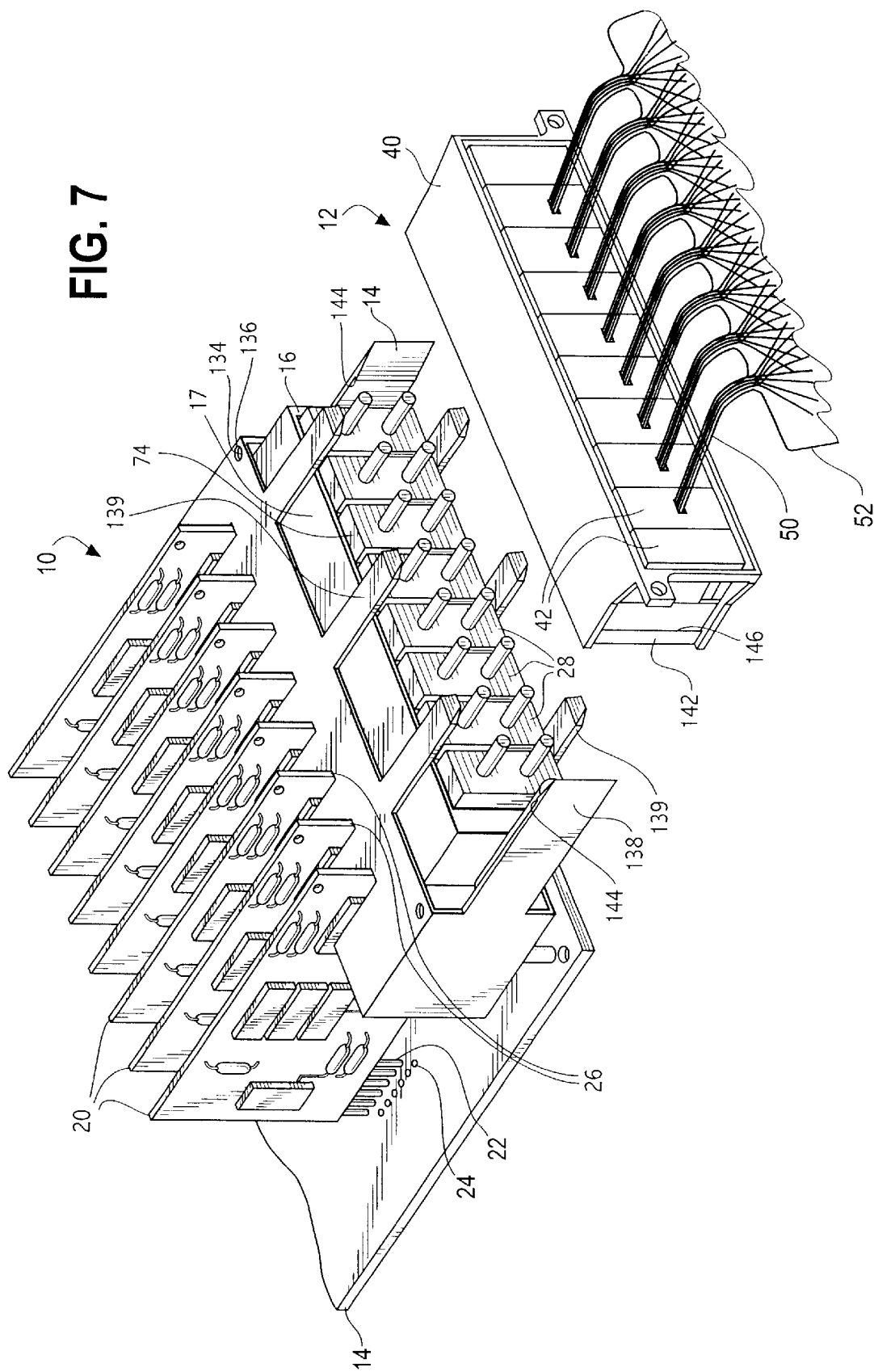
FIG. 7 is a perspective view of a high-density blindmate optoelectronic module according to an embodiment of the invention.

An alternate embodiment of a high-density blindmate optoelectronic module according to the present invention is shown in FIG. 7. This embodiment is substantially the same as that shown in FIG. 2, except that the coarse alignment pins 32 (FIG. 2) have been removed and an alignment clip 132 has been attached over the outer shroud 17. Circular bosses 134 protrude from the shroud 17 to engage alignment apertures 136 formed in the clip 132. Bosses 134 and apertures 136 align the clip with the module and act to hold the clip in place. Lateral alignment fingers 138 extend forwardly from the sides of clip 132. Fingers 138 are slightly flexible and have angled hook-like surfaces 140 at their distal ends. The fingers 138 engage slots 142 formed on the mating optical connector 12 when the module 10 is mated with connector 12. The interaction of the fingers 138 and slots 142 provide coarse lateral alignment of the module 10 with the connector 12. Coarse vertical alignment is less critical due to the position of the module 10 on the mother board 14. The vertical position of the mother board is fixed by the tracks into which the motherboard is being inserted. Nonetheless, a plurality of small tabs 139 extend forwardly from the upper and lower sides of the clip 132. The tabs 139 ensure that the module 10 mates vertically with the connector 12. Once the module 10 is fully mated with connector 12, an inwardly facing ridge 144 formed at the inward end of the angled hook-like surfaces 140 of lateral fingers 138 engages a corresponding lip 146 formed across slots 142. The fingers flex inward such that the ridges 144 engage the lips 146 to secure the module 10 to connector 12.

It should be noted that various changes and modifications to the present invention may be made by those of ordinary skill in the art without departing from the It should be noted that various changes and modifications to the present invention may be made by those of ordinary skill in the art without departing from the spirit and scope of the present invention which is set out in the attached claims. Furthermore, those of ordinary skill in the art will appreciate that the foregoing description is by way of example only, and is not intended to be limiting of the invention as described in the appended claims.

What is claimed is:

1. A high-density blindmate optoelectronic module adapted to mount on a printed circuit board and blindmate with a multi-fiber optical connector, the high density blindmate optoelectronic module comprising:

a transceiver mounting block;

a plurality of connectorized optical sub-assemblies mounted within said transceiver mounting block, each connectorized optical sub-assembly having a first side and a plurality of at least one of optical transmitters and optical receivers, said optical transmitters and receivers defining optical axes extending through the first side of said connectorized optical sub-assemblies;

circuitry for driving the optical transmitters and processing optical signals received by said optical receivers; and an electrical interface for transferring signals between the transceiver module and the printed circuit board.

2. The high-density blindmate optoelectronic module of claim 1 further comprising a front surface of said transceiver mounting block, and a coarse alignment member extending from said front surface of said transceiver mounting block configured to interact with the multi-fiber optical connector to facilitate blindmating of said transceiver module with said connector receptacle.

3. The high-density blindmate optoelectronic module of claim 2 further comprising at least one fine alignment member extending from the first side of one of said connectorized optical sub-assemblies, said fine alignment member configured to interact with said multi-fiber optical connector to precisely align the multiple optical fibers supported within said multi-fiber optical connector with the optical axes defined by the optical transmitters and receivers housed within said connectorized optical sub-assemblies.

4. The high-density blindmate optoelectronic module of claim 3 wherein said at least one fine alignment member comprises a pair of fine alignment pins extending from the first side of each of said connectorized optical sub-assemblies.

5. The high-density blindmate optoelectronic module of claim 1 further comprising a front surface of said transceiver mounting block, and an alignment bore formed within said front surface and adapted to receive an alignment member associated with said multi-fiber optical connector.

6. The high-density blindmate optoelectronic module of claim 5 further comprising at least one fine alignment bore formed within said first side of one of said connectorized optical sub-assemblies adapted to receive a fine alignment member associated with said multi-fiber optical connector.

7. The high-density blindmate optoelectronic module of claim 1 further comprising a plurality of daughter cards, at least one daughter card associated with each of said connectorized optical sub assemblies, wherein said circuitry for driving said transmitters and processing signals received by said receivers is formed on said daughter cards.

8. The high-density blindmate optoelectronic module of claim 7 wherein said electrical interface comprises a plurality of contact pins extending from said daughter cards, said contact pins being arranged to be received by contact structures formed on said mother board.

9. The high-density blindmate optoelectronic module of claim 7 wherein said connectorized optical sub-assemblies have a second side, said module further comprising a plurality of electrical leads extending from the second side of each connectorized optical sub-assembly, the electrical leads being electrically connected with said plurality of at least one of optical transmitters and optical receivers mounted within said connectorized optical sub-assemblies.

10. The high-density blindmate optoelectronic module of claim 9 wherein said electrical leads are soldered to contact pads formed on said daughter cards, said soldered connection securing said connectorized optical sub-assemblies to said daughter cards.

11. The high density blindmate optoelectronic module of claim 1 wherein said optical axes are substantially parallel to said mother board and arranged in a planar array substantially perpendicular to said mother board.

12. A system for providing a blindmate optical interface between an optical backplane mounted within a chassis based network element and a mother board removably connected within said chassis based network element, said system comprising:

a fiber-optic connector mounted on said backplane, said connector including at least first and second multi-fiber support ferrules, each ferrule having a plurality of optical fibers mounted therein, said fibers terminating at a front surface of said first and second multi-fiber support ferrules and extending into said backplane;

a high-density blindmate optoelectronic module adapted to be mounted on and electrically connected to said mother board, said high-density blindmate optoelectronic module having at least first and second connectorized optical sub-assemblies mounted in close proximity with one another within said module, said connectorized optical sub-assemblies having front surfaces;

a plurality of at least one of optical transmitters and optical receivers mounted within said connectorized optical sub-assemblies, said plurality of at least one of optical transmitters and receivers defining a plurality of optical axes extending through the front surfaces of said connectorized optical sub-assemblies and arranged in a plane extending perpendicular to a surface of said mother board;

a coarse alignment member associated with one of said high-density blindmate optoelectronic module and said fiber-optic connector, and a coarse alignment receiving surface associated with the other of said high-density blindmate optoelectronic module and said fiber-optic connector;

a fine alignment member associated with one of said connectorized optical sub assemblies and said multi-fiber support ferrules and a fine alignment receiving surface associated with the other of said connectorized optical sub-assemblies and said multi-fiber support ferrules;

the high-density blindmate optoelectronic module being located on said removable mother board in a position whereby, as said mother board is inserted into said chassis based network element, said coarse alignment member engages said coarse alignment surface, guiding said high-density blindmate optoelectronic module toward said fiber-optic connector, and after said coarse alignment member engages said coarse alignment surface said fine alignment members engage said fine alignment surfaces, said fine alignment members and said fine alignment surfaces acting to align said optical fibers with said optical axes.

13. The system of claim 12 further comprising a plurality of contact pins extending from said high-density blindmate optoelectronic module and a plurality of contact vias formed in said mother board, said contact vias being arranged to receive said contact pins and be electrically connected therewith.

14. The system of claim 13 wherein said contact pins have a diameter slightly larger than said contact vias, and said high-density blindmate optoelectronic module is secured to said mother board by a press fit connection between said contact pins and said vias.

15. The system of claim 13 wherein said contact pins are soldered within said contact vias.

16. The system of claim 12 further comprising a plurality of daughter cards, each daughter card associated with one of said connectorized optical sub-assemblies and supporting circuitry for driving said plurality of at least one of optical transmitters and optical receivers, each individual daughter card having circuitry specifically adapted for driving a particular combination of transmitters and receivers defined by the particular combination of transmitters and receivers mounted within the individual connectorized optical sub-assemblies associated with each individual daughter card.

17. The system of claim 12 wherein said coarse alignment member comprises first and second pins protruding from one of said high-density blindmate optoelectronic module and said fiber-optic connector, and said coarse alignment surface comprises first and second alignment bores formed in the other of said high-density blindmate optoelectronic module and said fiber-optic connector.

18. The system of claim 12 wherein said fine alignment members comprise first and second alignment pins protruding from one of said connectorized optical sub-assemblies and said multi-fiber support ferrules, and said fine alignment receiving surfaces comprise fine alignment bores formed in the other of said connectorized optical sub-assemblies and said multi-fiber support ferrules.

19. The system of claim 12 further comprising means for allowing one of said high-density blindmate optoelectronic module and said fiber-optic connector to move a small amount vertically, horizontally and transversely, to allow said coarse and fine alignment members to engage the respective coarse and fine alignment receiving surfaces and to allow the interaction of said coarse and fine alignment members to interact with said coarse and fine alignment receiving surfaces to properly align the optical fibers within the multi-fiber support ferrules with the optical axes defined by the optical transmitters and optical receivers housed within said connectorized optical sub-assemblies.

* * * * *